(12) United States Patent
Gil (10) Patent No.: US 6,904,507 B2
(45) Date of Patent: Jun. 7, 2005

(54) BUFFER MANAGEMENT ARCHITECTURE AND METHOD FOR AN INFINIBAND SUBNETWORK

(75) Inventor: Mercedes E Gil, Fort Collins, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 373 days.

(21) Appl. No.: 10/261,146

(22) Filed: Sep. 30, 2002

(65) Prior Publication Data

US 2004/0064664 A1 Apr. 1, 2004

(51) Int. Cl.[7] .............................................. G06F 12/00
(52) U.S. Cl. ...................... 711/170; 711/173; 711/217; 718/105; 718/104; 370/389; 370/235
(58) Field of Search ................................. 711/170, 173, 711/217; 370/235, 389; 718/105, 104

(56) References Cited

U.S. PATENT DOCUMENTS

| | | | | |
|---|---|---|---|---|
| 2001/0043564 A1 | * | 11/2001 | Bloch et al. | 370/230 |
| 2003/0193894 A1 | * | 10/2003 | Tucker et al. | 370/235 |
| 2003/0200315 A1 | * | 10/2003 | Goldenberg et al. | 709/225 |
| 2003/0223435 A1 | * | 12/2003 | Gil | 370/400 |
| 2004/0001487 A1 | * | 1/2004 | Tucker et al. | 370/389 |

OTHER PUBLICATIONS

Sancho, et al., "Effective Methodology for Deadlock–Free Minimal Routing in Infiniband Networks", © 2002 IEEE, p. 1–10.*

* cited by examiner

Primary Examiner—Donald Sparks
Assistant Examiner—Brian R. Peugh (57) ABSTRACT

An architecture and method for dynamically allocating and deallocating memory for variable length packets with a variable number of virtual lanes in an Infiniband subnetwork. This architecture uses linked lists and tags to handle the variable number of Virtual Lanes and the variable packet sizes. The memory allocation scheme is independent of Virtual Lane allocation and the maximum Virtual Lane depth. The disclosed architecture is also able to process Infiniband packet data comprising variable packet lengths, a fixed memory allocation size, and deallocation of memory when packets are either multicast or unicast. The memory allocation scheme uses linked lists to perform memory allocation and deallocation, while tags are used to track Infiniband subnetwork and switch-specific issues. Memory allocation and deallocation is performed using several data and pointer tables. These tables store packet data information, packet buffer address information, and pointer data and point addresses. The tags allow the memory allocation and deallocation process to correctly handle good and bad packets, as well as successive blocks within a data packet.

33 Claims, 7 Drawing Sheets

BUFFER MANAGEMENT ARCHITECTURE AND METHOD FOR AN INFINIBAND SUBNETWORK

TECHNICAL FIELD

This invention relates generally to the field of network technology, and more specifically to the management of memory allocation and de-allocation in an input/output architecture.

BACKGROUND OF THE INVENTION

Since 1991, when the PCI bus was introduced as one of the first industry standards for input/output and peripheral communications, many computer system architectures have utilized PCI for input/output (I/O) communications. During the time that the PCI standard has gained wide acceptance, the performance capabilities of the typical computer system have drastically improved. The increases in computer performance and the associated demands placed upon computer networks by end users has rapidly exceeded the capabilities for which the PCI bus was designed. Expensive high-end servers, database access systems, and network switches have addressed the shortcomings of the PCI standard through the creation of specialized and proprietary data transfer architectures. Newer, faster versions of the PCI architecture are also common, but these have the same inherent disadvantage of the PCI bus in that a parallel architecture is used. With the anticipated continued growth of demand for data services over the internet and in computer-computer communications, a new long-term solution was needed.

One proposed solution is the Infiniband architecture. Infiniband is a joint effort of several computer and peripheral manufacturers, including IBM, Intel, Compaq, HP, Dell, Microsoft and Sun Microsystems. The Infiniband specification describes an interconnect technology that enables processor nodes and input/output nodes to be joined together to form a system area network. The Infiniband architecture, if properly designed, is independent of the type of operating system and the processing platform used. This architecture is partially based upon the observation that with the needs for greater bandwidth and lower data latency, the input/output devices in a network have become more complex and have increased processing capabilities.

Figure 1:
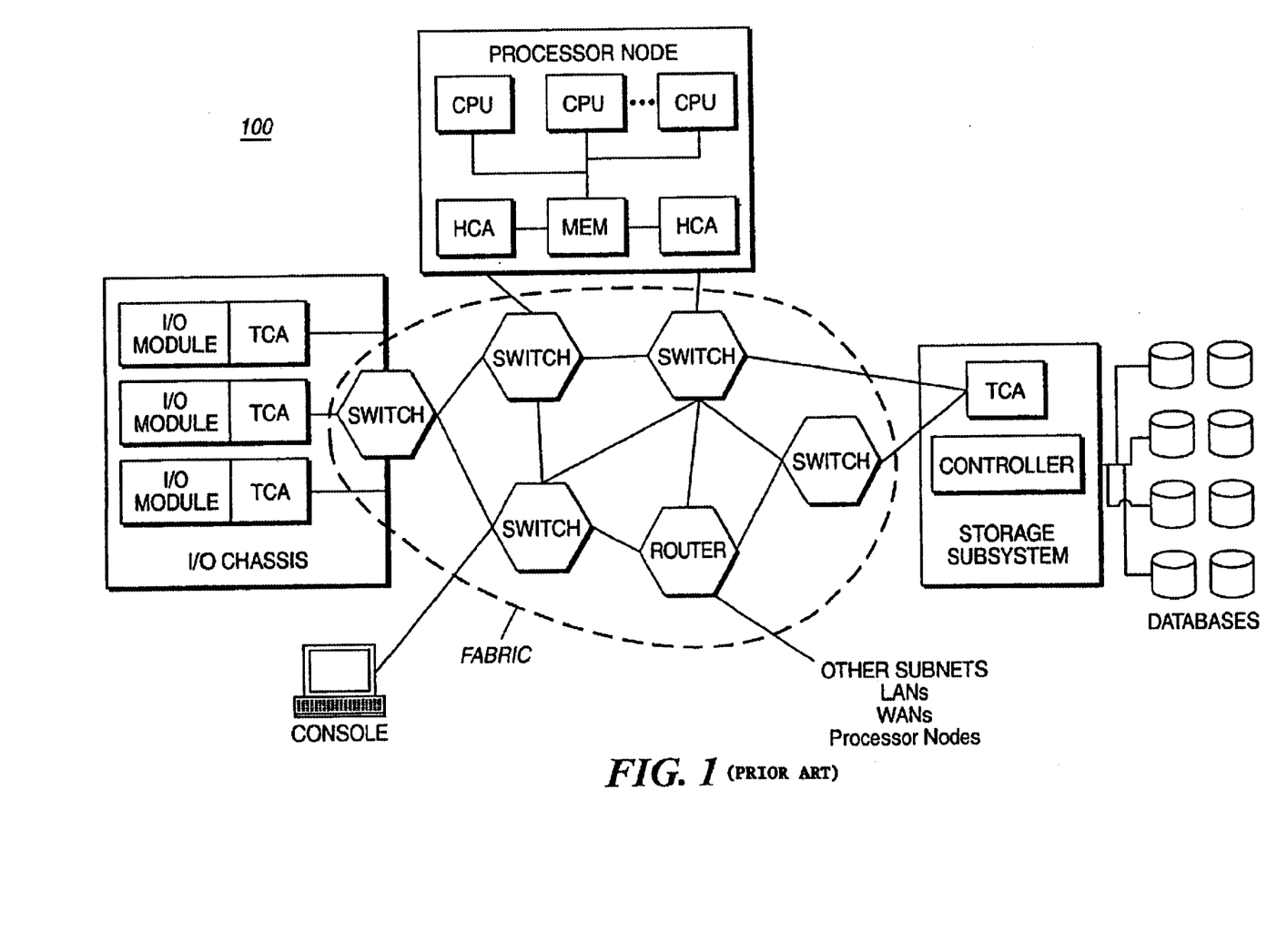
FIG. 1 is a high-level diagram of the Infiniband Architecture, according to the prior art.

Referring to FIG. 1, a high-level diagram of one subnetwork of the Infiniband Architecture 100 is shown. The Infiniband architecture is designed using an extensive I/O switched network. The subnetwork shown in FIG. 1 uses a point to point switching network, where each switch may be linked to one or more processing nodes, routers, I/O devices, and data storage devices. This type of link connectivity may be characterized as module-to-module or chassis-to-chassis, depending upon whether the links are within a larger subsystem or are links between subsystems. The collection of switches is called the Infiniband switching fabric or just fabric. The fabric is the heart of the Infiniband architecture and processing devices may be coupled to this fabric in a variety of ways. Typically each device coupled to the fabric has a channel adaptor interface. The Infiniband specification specifies two types of channel adaptors; the Host Channel Adaptor (HCA) and the Target Channel Adaptor (TCA). The HCA is designed for nodes that require more processing capability. The TCA is typically designed to support input/output devices. Both the TCA and HCA manage the transport level interactions with the switching fabric.

Figure 2:
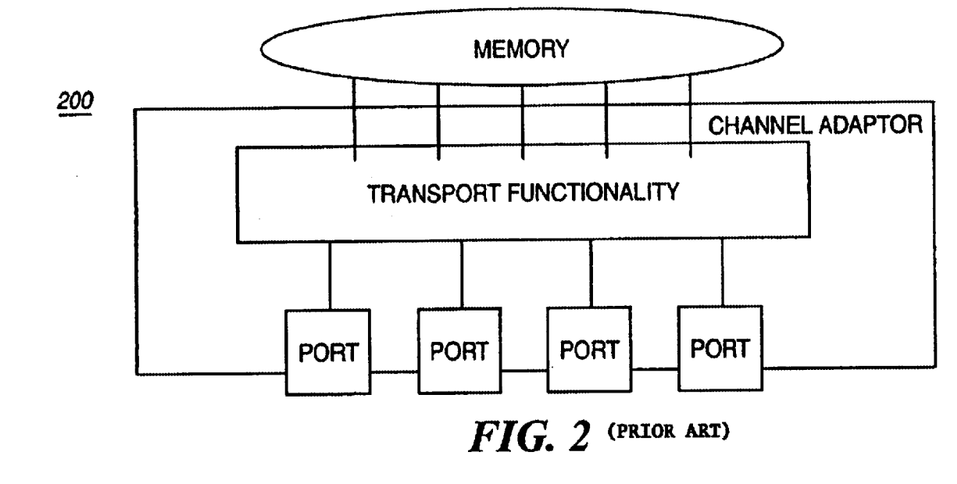
FIG. 2 is a high-level diagram of a channel adaptor, according to the prior art.

Referring now to FIG. 2, a more detailed diagram of a channel adaptor is shown, according to the prior art. Channel adaptors are used in the Infiniband architecture to generate and consume packets. These channel adaptors are present in the form of TCA's and HCA's. A channel adaptor allows devices external to the Infiniband specification access to data through a programmable direct memory access (DMA) engine. This DMA access may be executed locally or remotely. A channel adaptor may have multiple ports as shown in FIG. 2. Each port is coupled to the transport functionality using one or more Virtual Lanes (VLs). Each VL provides it's own buffering flow control so that each port can send and receive data packets simultaneously.

Figure 3:
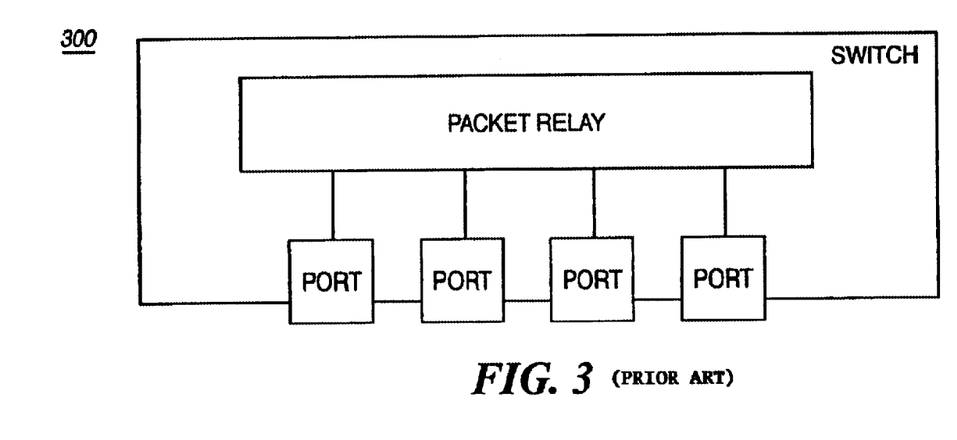
FIG. 3 is a high-level diagram of a switch, according to the prior art.

Referring now to FIG. 3, a more detailed diagram of an Infiniband switch is shown, according to the prior art. The switches specified in the Infiniband architecture generate or consume data. Packets received by the switch are forwarded to the destination address specified in the packets routing header. Thus, the utility of switches in the Infiniband architecture is the ability to interconnect links using switches to relay packets between the links. Switches are not directly addressed from the point of view of the end user. Instead, packets traverse a subnetwork transparently through the use of unique identifiers (LIDs). The switch forwards individual packets to an outgoing port using the value specified in the LID. One or more ports that may used for incoming and outgoing relay functionality are coupled to the switch through one or more Virtual Lanes. In general Infiniband switches support unicast or multicast routing. In unicast routing, a single packet is delivered to one destination, while multicast routing delivers a single packet to multiple destinations.

The Infiniband Specification contains several mechanisms to prioritize packets, prevent data overflow, and minimize packet blocking through links and switches. One of these mechanisms is the Virtual Lane. The Virtual Lane is a method of providing independent data streams on the same physical link. A single link can support up to 16 Virtual Lanes. This enables packets routed through different Virtual Lanes, or VL's, to be non-blocking relative to each other. To maximize flexibility, it is desirable to be able to program both the number of virtual lanes and the relative depth of the virtual lanes. This programmability, however, results in a difficult memory allocation and management problem. If memory is pre-assigned base on a maximum number of virtual lanes and virtual lane size, memory will be unused if a smaller number of virtual lanes or virtual lane depth are used. The situation is further complicated by the fact that Infiniband memory must be allocated in units of 64 bytes, or one credit, and that packet length is variable from the minimum legal size of 24 bytes to as much as 4220 bytes.

Thus, there is an unmet need in the art for an architecture and method for dynamically allocating and deallocating memory for random length packets with a variable number of virtual lanes in the packet data of an Infiniband subnetwork. There is a further need for an architecture that is able to handle Infiniband packet data using variable packet lengths and a fixed memory allocation size.

SUMMARY OF THE INVENTION

The architecture of the present invention provides for the allocation and deallocation of buffer memory associated with a variable number of Virtual Lanes (VL's) in a subnetwork. Memory is allocated and deallocated using a variable length packet size. This is accomplished using a linked list, which is designed to track the allocation and deallocation of the buffer memory among the one or more VL's. In addition to the linked list and the associated storage required for the linked list, tags are used to store link and device related information.

The method of the present invention provides for the allocation and deallocation of buffer memory associated the Virtual Lanes (VL's) and includes creating the storage elements required for the linked list, the tags and the buffer memory. After the storage elements have been created, memory is allocated upon receiving a packet from the subnetwork. This memory allocation includes reading a packet header and a first part of the packet. If a start tag contained in the packet header indicates the packet is correct the remaining portions comprising the packet are read, placed in memory and the linked list is updated. Each part of the packet contains fields that indicate how the packet is to be processed.

Memory is deallocated when a grant field of the start tag of a packet is a maximum grant value allowed. In this case, the memory associated with the packet is deallocated, which includes updating the linked list to reflect the absence of the packet in the buffer memory.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The architecture of the present invention provides for the allocation and deallocation of buffer memory associated with a variable number of Virtual Lanes (VL's) in a subnetwork, where the buffer memory is allocated and deallocated in 64 byte blocks. Each 64 byte block equates to one credit, although a different number of bytes could be defined as one credit. While the buffer memory is allocated in units of a credit, the buffer memory is stored in increments of a word. A word is 16 bytes in an embodiment of the present invention. The credits are allocated and deallocated using a variable length packet size. This is accomplished using a linked list, which is designed to track the allocation and deallocation of the buffer memory among the one or more VL's.

The linked list and the buffer memory are stored in several tables. A first table stores one or more words associated with the buffer memory, while a second table stores the linked list, which includes one or more pointer addresses, where each pointer address corresponds to a single credit of the buffer memory and pointer data words, where each pointer data word contains the address of the next pointer word in the linked list.

A third table is used to store one or more tag words, where each tag word corresponds to one credit in the buffer memory. Examples of tag words include, but are not limited to, a field indicating the packet is good or bad, a field containing the VL identifier associated with the packet, a field containing the number of grants associated with the packet, a field containing the packets pointer address and tag address, a field containing the packet start address, a field corresponding to the packet length, and a field that distinguishes a continuation tag from a start tag.

Figure 4:
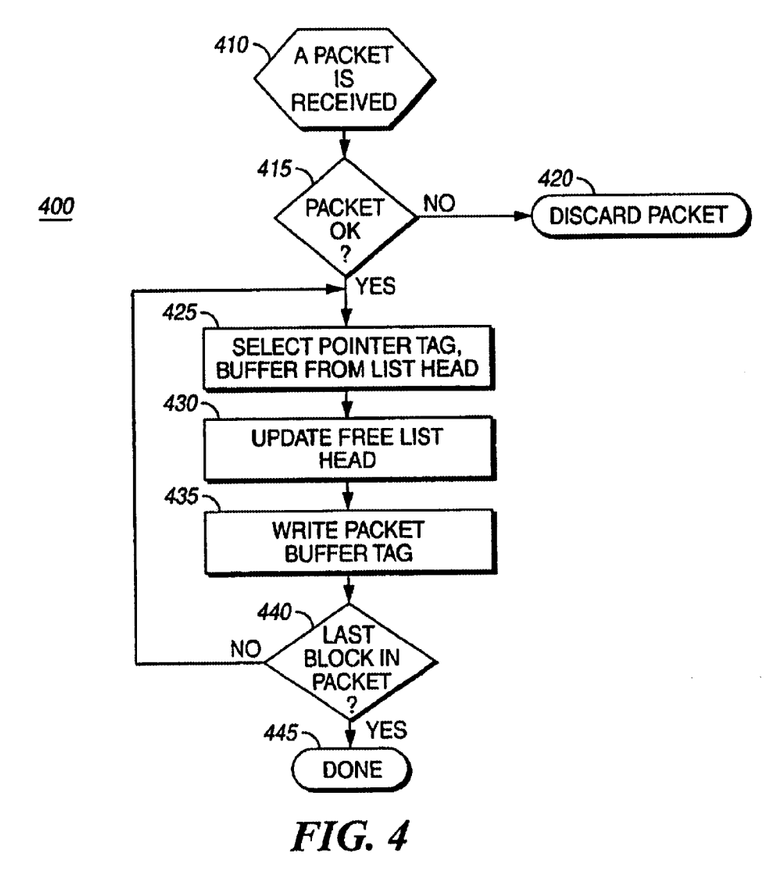
FIG. 4 is a flow diagram of memory allocation, in accordance with certain embodiments of the present invention.

The method of the present invention provides for the allocation and deallocation of buffer memory associated the Virtual Lanes (VL's) and includes creating the several tables required for the linked list, the tags and the buffer memory. After the tables have been created memory is allocated upon receiving a packet, comprising one or more credits, from the subnetwork. This memory allocation includes reading one or more fields of a start tag contained in a first credit of the one or more credits of the packet and where if the start tag indicates the packet is correct the first credit is placed in the buffer memory and the remaining credits comprising the packet are read, continuation tags are generated for each of the remaining credits, and the linked list is updated. Thus, each of the remaining credits contains a continuation tag that contains one or more of the tag word fields that indicate how a packet is to be processed. Referring now to FIG. 4, a flow diagram 400 of the allocation of packets according to a certain embodiment of the present invention is shown. A packet is received by the subnetwork as in block 410. The subnetwork determines whether the packet contains any errors (block 415). If the packet is in error, then the packet is discarded and the process of memory allocation is halted (block 420). If the packet is correct, then a pointer tag and buffer are selected for each block in the packet using the free list head as in block 425. The free list head is then updated (block 430), and the packet buffer and the tag are written to memory (block 435) for each block in the packet. When the last block in the packet is reached, the memory allocation process is complete.

Figure 5:
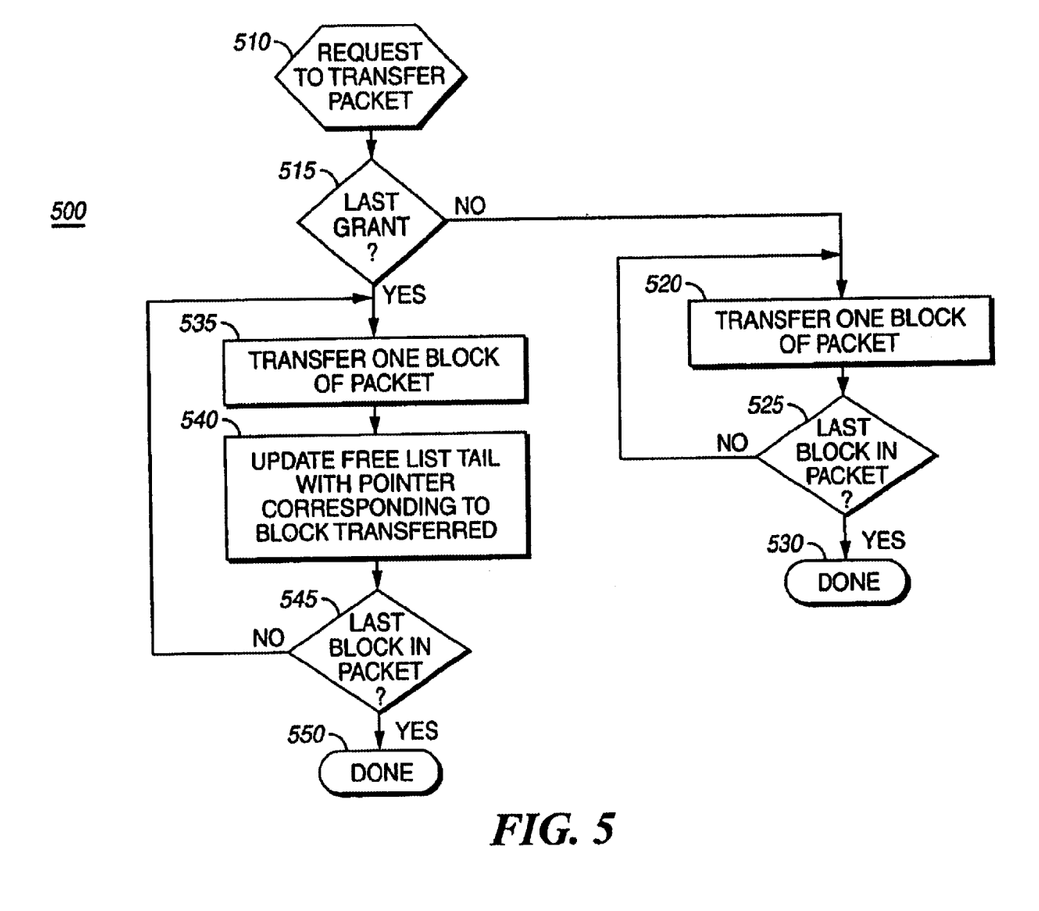
FIG. 5 is a flow diagram of memory deallocation, in accordance with certain embodiments of the present invention.

Memory is deallocated when a grant field of the start tag of a packet is a maximum grant value allowed. In this case, the memory associated with the packet is deallocated, which includes updating the linked list to reflect the absence of the packet in the buffer memory. Referring now to FIG. 5, a flow diagram 500 of the deallocation of packets according to a certain embodiment of the present invention is shown. A request to transfer a packet out of memory is received as in block 510. If the packet has grants remaining (no in block 515), then one or more blocks of the packet are transferred (block 520). When the last block in the packet has been transferred (block 525), the transfer is complete (block 530). Note that if the packet has grants remaining, then the memory associated with the packet is not deallocated.

If the request to transfer the packet is the last grant available (yes in block 515), then the one or more blocks comprising the packet are transferred (block 535), and the free list tail and the pointer corresponding to each block transferred are updated (block 540). The memory deallocation process is complete (block 550) when the last block is transferred (block 545).

An example of the method and architecture of the present invention is now provided. In a commercially available chip, the Buzz chip, there is a fixed amount of available input buffer memory, amounting to 19392 bytes. This translates to 303 64-byte quantities, or 303 credits. The number of VLs supported by Buzz is programmable from a default of 0 to 8. In all cases, 5 credits are reserved for management packets, and the remaining 298 are evenly divided between the programmed number of VLs.

As discussed above the memory allocation method comprises two parts. The first is a linked list allocation of memory that is not specific to Infiniband and can be applied to any memory scheme. The second part, the tags associated with each credit, supports calculation per VL, deallocation of memory for unicast and multicast packets, and variable, unspecified length packets.

To manage the memory allocation, 3 separate tables are used, as well as free list head and tail pointers for the linked list. It is noted that alternate storage elements such as structures or databases could be used without departing from the spirit and scope of the present invention. The packet buffer is a 19392 byte ram, arranged in 16-byte words. As memory is allocated in 64-byte blocks, there is a 303 word pointer table to store the linked list. Each address in the pointer table corresponds to a 64-byte block in the packet buffer. Each word in the pointer table is the address of the next word in the list. There is also a 303 word tag ram. Each word in the tag table corresponds to a 64-byte block in the packet buffer, and contains fields for the packet input VL, a packet buffer type code, and the number of times this packet has been transferred through the hub (this last field is important for multicast support). The packet input VL is important during memory allocation and deallocation to support Infiniband's credit allocation scheme. The packet buffer type is used to help deal with error packet schemes. The packet buffer type is used to help deal with error packets that are shorter than the packet's reported length. The number of times this packet has been transferred across the hub, or grant count, is used to determine when the memory for this packet may be deallocated.

Figure 6:
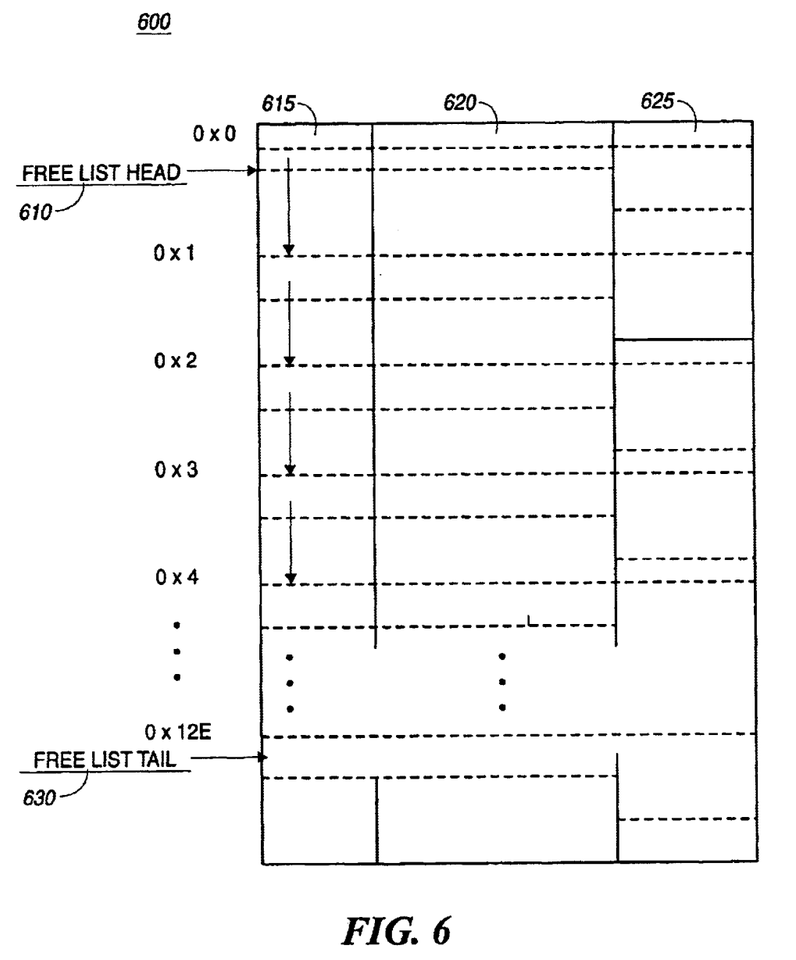
FIG. 6 is a buffer memory diagram prior to memory allocation, in accordance with certain embodiments of the present invention.

Memory Allocation: After a system reset, the contents of the three tables are un-initialized. Referring now to FIG. 6, a buffer memory diagram 600 prior to memory allocation is shown, in accordance with certain embodiments of the present invention.

A free list head pointer 610 is pointing to address 0x0, while a free list tail 630 is pointing to address 0x12E. The pointer memory 615, tag memory 620, and packet buffer memory 625 are each referenced relative to the value of the free list head pointer 610 and free list tail pointer 630. By inspection, the buffer memory of FIG. 6 contains no packets in the packet buffer memory 625. The free list head is 0, and the free list tail is 302=0x12E, or the maximum pointer address. When packets begin arriving into the Infiniband link after chip reset, packets are put into the packet buffer and the pointer table is slowly initialized to represent contiguous packet ordering. As an example, consider the case where a 93-byte packet arrives into the link after reset. The pointer table and packet buffer will contain the following:

TABLE 1

| Pointer address | Pointer data | Packet buffer addresses | Packet data (big-endian numbering) |
| --- | --- | --- | --- |
| 0 × 0 | 0 × 1 | 0 × 0–0 × 3 | bytes 0–63 of packet 1 |
| 0 × 1 | 0 × 2 | 0 × 4–0 × 5 | bytes 0–29 |
|  |  | 0 × 6–0 × 7 | undefined |
| 0 × 2–0 × 12E | undefined | 0 × 8–0 × 4BC | undefined |

The free list head is now 2, and the free list tail is 0x12F. Using the situation shown above, let's assume a 308 byte packet arrives into the link. The pointer table and packet buffer will now contain the following:

TABLE 2

| Pointer address | Pointer data | Packet buffer addresses | Packet data (big-endian numbering) |
| --- | --- | --- | --- |
| 0 × 0 | 0 × 1 | 0 × 0–0 × 3 | bytes 0–63 of packet A |
| 0 × 1 | 0 × 2 | 0 × 4–0 × 5 | bytes 64–92 of packet A |
|  |  | 0 × 6–0 × 7 | undefined |
| 0 × 1 | 0 × 3 | 0 × 8–0 × b | bytes 0–63 of packet B |
| 0 × 3 | 0 × 4 | 0 × c–0 × f | bytes 64–127 of packet B |
| 0 × 4 | 0 × 5 | 0 × 10–0 × 13 | bytes 128–191 of packet B |
| 0 × 5 | 0 × 6 | 0 × 14–0 × 17 | bytes 192–255 of packet B |
| 0 × 6 | 0 × 7 | 0 × 18–0 × 1b | bytes 256–308 of packet B |
| 0 × 2–0 × 12E | undefined | 0 × 8–0 × 4BC | undefined |

The free list head is now 7, and the free list tail is 0x12E. In this manner, packet memory is consumed and the pointer table is built. If no packets were ever transferred out of memory, and no memory was ever deallocated, the free list head would eventually be 0x12E, and the free list tail would stay at 0x12F. In an embodiment of the present invention, the free list head is prevented from matching the free list tail.

Now consider an example of the deallocation of memory. In the Buzz infiniband switch, each packet results in an arbitration request, and eventually will result in one or more grants. In the case of a switch, this will result in a transfer through the switch crossbar. In the Infiniband protocol, each input port/output port/output VL combination behaves like a first-in-first-out (fifo). However, as the input packet buffer contains data for multiple output ports and multiple VLs, the input buffer is true random-access memory.

Now examine a simple case, where a packet is a unicast packet, and therefore receives a single grant which results in memory deallocation. Continuing the example shown in Table I and Table II, assume packet B is granted sometime after it arrives at the link. Packet data is read from the packet buffer and transferred into the link. The pointer addressed by the free list tail is written with the address of the first pointer in the packet in this case, 0x2; the free list tail is then set to 0x2. When the next 64-byte block is deallocated, the pointer addressed by free list tail is set to the address MOD 4 address of the block to be deallocated, which in this example is 0x3. When the packet has been transferred and memory has been deallocated, the pointer table looks like:

TABLE 3

| Pointer Address | Pointer data | Packet buffer addresses | Packet data (big-endian numbering) |
|---|---|---|---|
| 0 x 0 | 0 x 1 | 0 x 0–0 x 3 | bytes 0–63 of packet A |
| 0 x 1 | 0 x 2 | 0 x 4–0 x 5 0 x 6–0 x 7 | bytes 64–92 of packet A undefined |
| 0 x 2 | 0 x 3 | 0 x 8–0 x b | N/A |
| 0 x 3 | 0 x 4 | 0 x c–0 x f | N/A |
| 0 x 4 | 0 x 5 | 0 x 10–0 x 13 | N/A |
| 0 x 5 | 0 x 6 | 0 x 14–0 x 17 | N/A |
| 0 x 6 | 0 x 7 | 0 x 18–0 x 1b | N/A |
| 0 x 0 x 12d | undefined | 0 x 8–0 x 4BC | undefined |
| 0 x 12E | 0 x 2 | | |

The free list head is still 7, and the free list tail is 0x6.

Now, assume unicast packet A is granted, and memory is deallocated. The pointer addressed by the free list tail is overwritten with the address MOD 4 of each 64-byte block in packet A as the packet is being transferred through the switch. The pointer table now looks like:

TABLE 4

| Pointer Address | Pointer data | Packet buffer addresses | Packet data (big-endian numbering) |
|---|---|---|---|
| 0 x 0 | 0 x 1 | 0 x 0–0 x 3 | N/A |
| 0 x 1 | 0 x 2 | 0 x 4 | N/A |
| 0 x 2 | 0 x 3 | 0 x 8–0 x b | N/A |
| 0 x 3 | 0 x 4 | 0 x c–0 x f | N/A |
| 0 x 4 | 0 x 5 | 0 x 10–0 x 13 | N/A |
| 0 x 5 | 0 x 6 | 0 x 14–0 x 17 | N/A |
| 0 x 6 | 0 x 0 | 0 x 18–0 x 1b | N/A |
| 0 x 2–0 x 12D | undefined | 0 x 8–0 x 4BC | undefined |
| 0 x 12E | 0 x 2 | | |

The free list head is still 7, and the free list tail has moved from 0x6 to 0x0 to 0x1.

After allocating the first 0x12f blocks of memory, and fully initializing the pointer table, the pointer is then read to determine which block to consume next. Continuing the example shown in Table 4 above, assume packets continue to arrive into the switch so that the free list head is eventually 0x12E. When the next 64-byte block of a packet arrives, the pointer table is read at address 0x12E, or free list head, to determine the new free list head.

Figure 7:
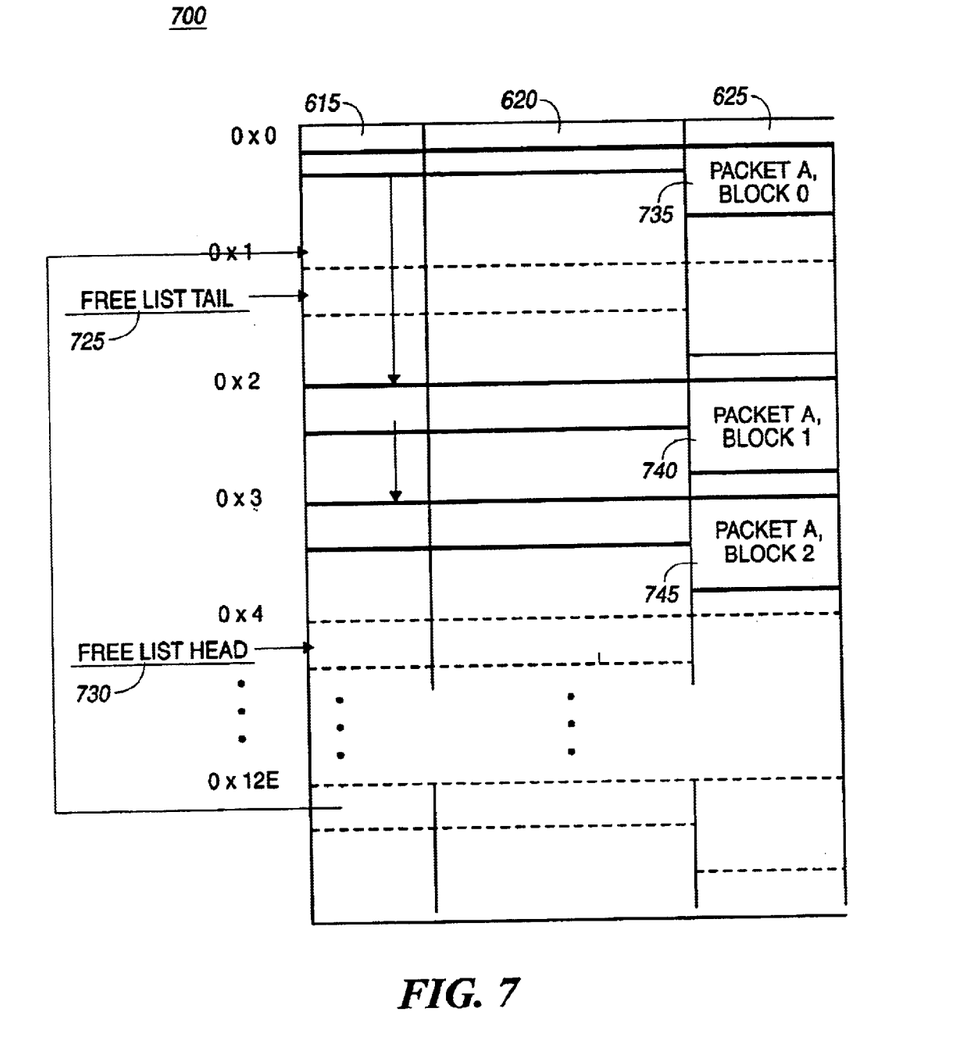
FIG. 7 is a buffer memory diagram after memory allocation, in accordance with certain embodiments of the present invention.

As another example of the memory allocation process, refer now to FIG. 7, which shows a buffer memory diagram 700 corresponding to the situation in which many packets have passed through buffer memory in accordance with a certain embodiment of the present invention. A single packet A is shown, comprising a block 0 (number 735), block 1 (number 740), and block 2 (number 745). Block 0 (number 735) of packet A is located at address 0x0, while block 1 (number 740) of packet A is at address 0x2 and block 2 (number 745) of packet A is at address 0x3. So, packet A is fragmented and free list tail 725 is pointing to address 0x1, while free list head 730 points to address 0x4.

Figure 8:
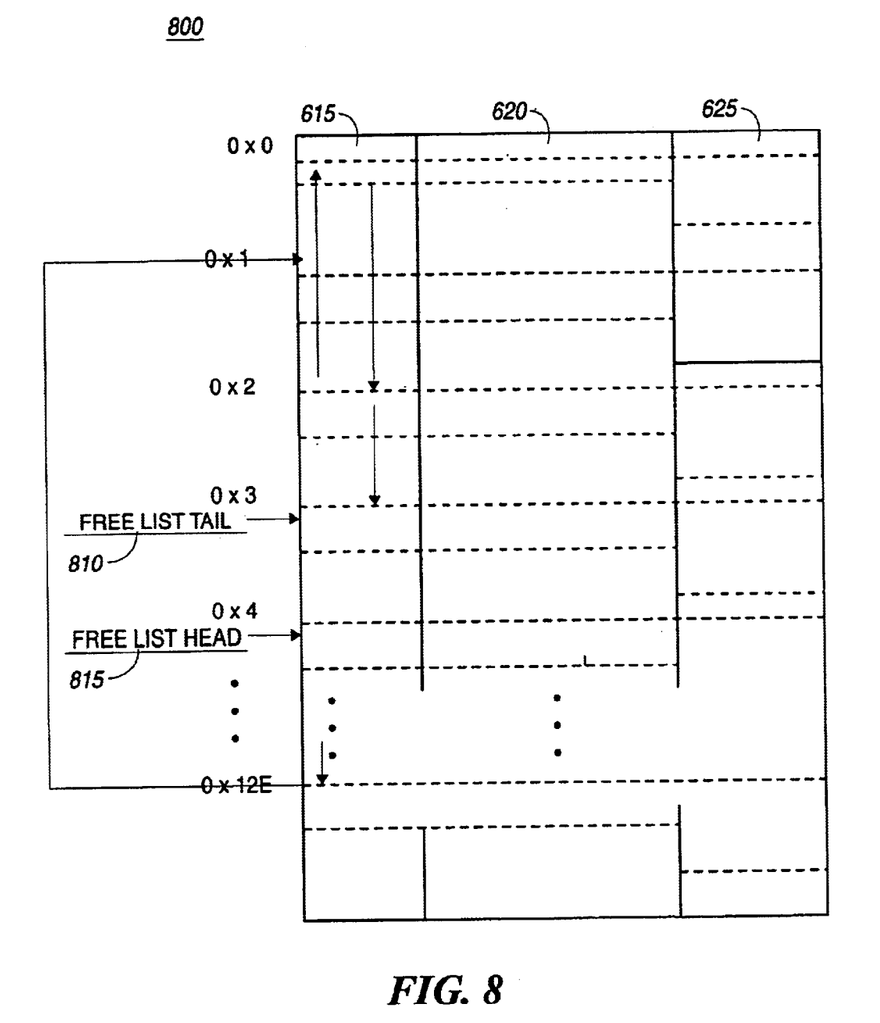
FIG. 8 is a buffer memory diagram after a memory deallocation, in accordance with certain embodiments of the present invention.

Referring now to FIG. 8, a buffer memory diagram 800 is shown after a memory deallocation, in accordance with certain embodiments of the present invention. The buffer memory diagram 800 of FIG. 8 corresponds to the buffer memory diagram 700 of FIG. 7, in the case where packet A has been transferred and memory associated with packet A has been deallocated. The memory for packet A, shown in FIG. 7, previously used addresses 0x0, 0x2, and 0x3, and resulted in free list tail 725 at 0x1 and free list head 730 at 0x4. After packet A is transferred and the memory associated with packet A is deallocated, free list tail 810 points to address 0x3 and free list head 815 points to address 0x4. The fact that the memory associated with packet A was fragmented causes the order of memory allocation to change. The memory allocation order of FIG. 8 starts at 0x04 through 0x12E, and then jumps to 0x1→0x0→0x2→0x3. This is in contrast to the memory allocation order 0x4-0x12E→0x1 of the buffer memory allocation of FIG. 7. It is noted that this example does not limit the scope of the invention, and is designed to show that the method of the present invention is operable to handle the situation in which packet buffer memory becomes fragmented during the normal operation of the subnetwork.

While the pointer table, free list head, and free list tail deal with the allocation and deallocation of buffers, the tag table is needed to deal with some Infiniband and switch-specific concerns. There are two types of tags, a start tag and continuation tag, distinguished by tag opcodes. Additionally, the start tag opcode may indicate that the packet is good or bad. A start tag corresponds to the first 64-byte block in a packet. A continuation tag corresponds to each successive 64-byte block in the packet. The tag for a specific 64-byte is located at the block address MOD 4.

Most of the important information in a tag is contained in a block's start tag. In Infiniband, memory availability must be recorded per VL. Therefore, when buffers are allocated for a particular packet, the amount of buffer space available for that packet's virtual lane is decreased by the number of 64-byte blocks consumed by that packet. When that packet is transferred out of the input buffer and memory is deallocated, new buffer space is available for that packet's input VL. To simplify the determination of a packet's VL, the VL is stored in a field in the start tag.

Another key field in a start tag is the number of grants received by value, which is initialized to 0. In the Buzz infiniband switch, a multicast packet destined for N ports will receive N grants, generally resulting in N transfers to an output port through the crossbar. If a packet must be transferred N times, memory must not be deallocated until the last transfer. For this reason, the grant word contains the total number of grants this packet will receive as well the packet starting address MOD 4, which is equivalent to the packet's pointer address and tag address. The start tag, containing the number of grants this packet has received, is read. If the packet has already received N grants, memory for this packet is deallocated. If the packet has not yet received N grants, the grant count field in the tag table is incremented, and memory is not deallocated.

Continuation tags are used to deal with error packets. Although Infiniband packets have a packet length field, which is reflected in the grant word for a packet, an error packet may be much shorter than the packet length specified. An overly long error packet will be truncated at the specified packet length. For an error packet, the packet length field cannot be used to determine when to stop transferring a packet, and how much memory to deallocate for that packet. Therefore, an alternate method must be used.

A continuation tag contains a continuation opcode and the start packet address MOD 4. When transferring a packet and deallocating memory, if a tag is read which does NOT contain a continuation opcode and the current packet's start address, we know that the 64-byte block corresponding to that tag is NOT part of the packet. Therefore, the previously read block is the last block in this error packet and the transfer and deallocation should stop after that block is deallocated.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An architecture for the allocation and deallocation of buffer memory associated with a variable number of one or more Virtual Lanes (VL's) in a subnetwork, wherein said buffer memory is allocated and deallocated using blocks of one or more credits while said buffer memory is stored in increments of a word, and the one or more credits are allocated and deallocated using a variable length packet size, further comprising:
   a linked list, operable to track the allocation and deallocation of the buffer memory among the one or more VL's;
   a first table, operable to store one or more words associated with the buffer memory;
   a second table, operable to store the linked list, said second table comprising:
      one or more pointer addresses, each pointer address corresponding to one credit of the buffer memory and a tag address;
      one or more pointer data words, each pointer data word of the one or more pointer data words containing the address of the next pointer word in the linked list;
   a third table, operable to store one or more tag words, each tag word of the one or more tag words corresponding to one credit in the buffer memory and each tag word of the one or more tag words further comprising one or more of:
      one or more tag addresses corresponding to a pointer address
      and the one credit of buffer memory;
      a field indicating the packet is good or bad;
      a field containing the VL identifier associated with the packet;
      a field containing the number of grants associated with the packet;
      a field containing the packet start address;
      a field corresponding to the packet length; and
      a field that distinguishes a continuation tag from a start tag.

2. The architecture of claim 1, wherein the buffer memory is equally divided among the one or more VLs.

3. The architecture of claim 1, wherein the linked list is further described using a free list head pointer and a free list tail pointer.

4. The architecture of claim 1, wherein the first table is operable to be initialized to represent contiguous input packet ordering.

5. The architecture of claim 1, wherein the third table is a random access table.

6. The architecture of claim 1, wherein one word is 16 bytes.

7. The architecture of claim 1, wherein one credit is 64 bytes.

8. The architecture of claim 1, wherein prior to dividing said buffer memory between the one or more VL's, one or more blocks of memory are reserved for management functionality.

9. The architecture of claim 1, wherein the buffer memory is contained within an Infiniband subnetwork.

10. The architecture of claim 1, wherein one or more of the one or more packets are multicast.

11. The architecture of claim 1, wherein the number of VL's is 8.

12. The architecture of claim 1, wherein the VL depth is variable.

13. A method for the allocation and deallocation of buffer memory associated with a variable number of one or more Virtual Lanes (VL's) in a subnetwork, wherein said buffer memory is allocated and deallocated using blocks of one or more credits while said buffer memory is stored in increments of a word, and the one or more credits are allocated and deallocated using a variable length packet size, further comprising:
   creating one or more storage elements, operable to store:
      one or more words associated with the buffer memory;
      a linked list and associated pointer information;
      one or more tag words, each tag word of the one or more tag words corresponding to one credit in the buffer memory;
   an allocation phase, further comprising:
      receiving a packet, comprising one or more credits, from the subnetwork;
      reading one or more fields of a tag in a header contained in a first credit of the one or more credits of the packet and whereupon if the tag indicates the packet is correct placing the first credit in the buffer memory and a start tag in the tag table;
      if the packet is correct generating one or more continuation tags of each subsequent credit of the one or more credits of the packet wherein said one or more credits are placed in memory and the one or more continuation tags are placed in the tag table;
      updating the linked list to reflect the packets and the one or more credits placed in memory;
   a deallocation phase, further comprising:
      reading a tag of a packet of one or more packets stored in the buffer memory, wherein if a grant field of the tag is a maximum grant value allowed, the memory associated with the packet is deallocated, further comprising updating the linked list to reflect the absence of the packet in the buffer memory.

14. The method of claim 13, wherein the one or more storage elements are one or more tables.

15. The method of claim 13, wherein each tag word of the one or more tag words further comprising one or more of:
   a packet input VL;
   a packet buffer type code; and
   a number of times packet has been transferred through the subnetwork.

16. The method of claim 13, wherein the linked list further comprises:
   one or more pointer addresses, each pointer address corresponding to one credit of the buffer memory; and
   one or more pointer data words, each pointer data word of the one or more pointer data words containing the address of the next pointer word in the linked list.

17. The method of claim 16, further comprising
   initializing a free list head to a 0 pointer address of the one or more pointer addresses; and
   initializing a free list tail to a maximum pointer address of the one or more pointer addresses.

18. The method of claim 17, wherein the allocation phase further comprises:
   after placing the first credit in the buffer memory, initializing a pointer address of the one or more pointer addresses;

whereupon said credit of the one or more credits of the packet are placed in memory in accordance with the address of the free list head and the address of the free list tail;

writing a tag associated with each credit of the one or more credits;

updating the free list head to point to a next available input buffer address; and updating the free list tail to point to a new maximum pointer address.

19. A method for the allocation and deallocation of buffer memory associated with a variable number of one or more Virtual Lanes (VL's) in a subnetwork, wherein said buffer memory is allocated and deallocated using blocks of one or more credits while said buffer memory is stored in increments of a word, and the one or more credits are allocated and deallocated using a variable length packet size, further comprising:

a setup phase, further comprising:
  assigning the buffer memory among the one or more VL's;
  creating a first table, operable to store one or more words associated with the buffer memory;
  creating a second table, operable to store a linked list that tracks allocation of buffer memory among the one or more VL's, said second table comprising:
    one or more pointer addresses, each pointer address corresponding to one credit of the buffer memory;
    one or more pointer data words, each pointer data word of the one or more pointer data words containing the address of the next pointer word in the linked list;
  creating a third table, operable to store one or more tag words, each tag word of the one or more tag words corresponding to one credit in the buffer memory and each tag word of the one or more tag words further comprising one or more of:
    a packet input VL;
    a packet buffer type code;
    a number of times packet has been transferred through the subnetwork;
  initializing a free list head to a 0 pointer address of the one or more pointer addresses;
  initializing a free list tail to a maximum pointer address of the one or more pointer addresses;

an allocation phase, further comprising:
  receiving a packet, comprising one or more credits, from the subnetwork;
  reading a packet header comprising a start tag contained in a first credit of the one or more credits of the packet and determining if the packet is correct, whereupon if the packet is correct further comprising;
    placing the first credit in the buffer memory and initializing a pointer address of the one or more pointer addresses;
  writing a tag associated with each credit of the one or more credits;
  reading a continuation tag of each subsequent credit of the one or more credits of the packet wherein said one or more credits are placed in memory in accordance with the address of the free list head and the address of the free list tail;
  updating the free list head to point to a next available input buffer address;
  updating the free list tail to point to a new maximum pointer address;

a deallocation phase, further comprising:
  reading a tag of a packet of one or more packets stored in the buffer memory, wherein if a grant field of the tag is a maximum grant value allowed, the memory associated with the packet is to be deallocated, further comprising;
    updating the free list tail to be an address of a first pointer in the packet;
    as each credit of the packet is transferred, setting the free list tail to the address mod 4 of the credit to be transferred; and
    deallocating memory using the free list head so assigned.

20. The method of claim 19, whereupon if the grant field of the packet is not the maximum value allowable, the grant field is incremented and the packet is not deallocated.

21. The method of claim 19, wherein the third table is a random access table.

22. The method of claim 19, wherein a tag further comprises one or more of:
  a field indicating the packet is good or bad;
  a field containing the VL identifier associated with the packet;
  a field containing the number of grants associated with the packet;
  a field containing the packet start address;
  a field corresponding to the packet length; and
  a field that distinguishes a continuation tag from a start tag.

23. The method of claim 19, wherein a tag for a given credit is located at the pointer address mod 4 of the credit.

24. The method of claim 19, wherein when a packet is allocated, the start tag associated with the packet is read and the number of credits available to the VL associated with the packet is decreased by the number of credits in the packet.

25. The method of claim 19, wherein when a packet is deallocated, the number of credits available to the VL associated with the packet is increased by the number of credits in the packet.

26. The method of claim 19, wherein one word is 16 bytes.

27. The method of claim 19, wherein one block of buffer memory is one credit, and one credit is 64 bytes.

28. The method of claim 19, wherein the buffer memory is evenly divided between the one or more VL's.

29. The method of claim 19, wherein prior to dividing said buffer memory between the one or more VL's, one or more blocks of memory are reserved for management functionality.

30. The method of claim 19, wherein the buffer memory is contained within an Infiniband subnetwork.

31. The method of claim 19, wherein one or more of the one or more packets are multicast.

32. The method of claim 19, wherein the number of VL's is 8.

33. The method of claim 19, wherein the VL depth is variable.

* * * * *